US008677285B2

(12) United States Patent
Tsern et al.

(10) Patent No.: US 8,677,285 B2
(45) Date of Patent: Mar. 18, 2014

(54) USER INTERFACE OF A SMALL TOUCH SENSITIVE DISPLAY FOR AN ELECTRONIC DATA AND COMMUNICATION DEVICE

(75) Inventors: Ely Tsern, Los Altos, CA (US); Dave Mooring, Los Altos Hills, CA (US)

(73) Assignee: WIMM Labs, Inc., Los Altos, CA (US)

( * ) Notice: Subject to any disclaimer, the term of this patent is extended or adjusted under 35 U.S.C. 154(b) by 877 days.

(21) Appl. No.: 12/360,030

(22) Filed: Jan. 26, 2009

(65) Prior Publication Data

US 2009/0199130 A1    Aug. 6, 2009

Related U.S. Application Data

(60) Provisional application No. 61/025,748, filed on Feb. 1, 2008.

(51) Int. Cl.
*G06F 3/14* (2006.01)
*G06F 3/033* (2013.01)
*G06F 3/01* (2006.01)

(52) U.S. Cl.
USPC ............................ 715/864; 715/863; 715/702

(58) Field of Classification Search
USPC ............................ 715/863, 864, 702; 345/173
See application file for complete search history.

(56) References Cited

U.S. PATENT DOCUMENTS

| | | | |
|---|---|---|---|
| 4,139,837 A | 2/1979 | Liljenwall | |
| 5,252,951 A | 10/1993 | Tannenbaum et al. | |
| 6,271,835 B1 | 8/2001 | Hoeksma | |
| 6,300,947 B1 * | 10/2001 | Kanevsky | 715/866 |
| 6,525,997 B1 | 2/2003 | Narayanaswami et al. | |
| 6,639,584 B1 * | 10/2003 | Li | 345/173 |
| 6,753,882 B2 * | 6/2004 | Nakazawa et al. | 715/768 |
| 6,882,596 B2 | 4/2005 | Guanter et al. | |
| 6,956,562 B1 * | 10/2005 | O'Hara et al. | 715/864 |
| 6,967,903 B2 | 11/2005 | Guanter | |
| 7,030,861 B1 | 4/2006 | Westerman et al. | |
| 7,055,110 B2 | 5/2006 | Kupka | |
| 7,180,500 B2 | 2/2007 | Marvit et al. | |
| 7,257,430 B2 | 8/2007 | Lenchik et al. | |
| 7,286,063 B2 | 10/2007 | Gauthey et al. | |
| 7,506,269 B2 * | 3/2009 | Lang | 715/864 |

(Continued)

FOREIGN PATENT DOCUMENTS

| | | |
|---|---|---|
| GB | 2344905 A | 6/2000 |
| WO | PCT/US09/32753 | 1/2009 |
| WO | 2010016065 A1 | 2/2010 |
| WO | 2010107653 A2 | 9/2010 |

OTHER PUBLICATIONS

PCT, International Searching Authority, International Search Report and Written Opinion for correponding PCT case, mailed Mar. 11, 2009.

(Continued)

*Primary Examiner* — Weilun Lo
*Assistant Examiner* — Dino Kujundzic
(74) *Attorney, Agent, or Firm* — Convergent Law Group LLP

(57) ABSTRACT

A method and apparatus for receiving an input by a user on an interactive touchscreen display based, electronic data and communication device, the input comprising a contact gesture, which further comprises touchscreen single or multiple simultaneous contacts. The contact gestures are classified as primary, secondary, tertiary, universal and non-universal contact gestures. The method further includes performing an operation or entering an operational mode based on the user input.

26 Claims, 5 Drawing Sheets

(56) References Cited

U.S. PATENT DOCUMENTS

| | | | |
|---|---|---|---|
| 8,422,210 B2* | 4/2013 | Moser | 361/679.09 |
| 8,541,745 B2* | 9/2013 | Dickinson et al. | 250/340 |
| 2002/0011990 A1 | 1/2002 | Anwar | |
| 2005/0057524 A1* | 3/2005 | Hill et al. | 345/173 |
| 2005/0212751 A1* | 9/2005 | Marvit et al. | 345/156 |
| 2005/0216867 A1 | 9/2005 | Marvit et al. | |
| 2005/0267676 A1* | 12/2005 | Nezu et al. | 701/200 |
| 2006/0005156 A1 | 1/2006 | Korpipaa et al. | |
| 2006/0026521 A1 | 2/2006 | Hotelling et al. | |
| 2006/0092177 A1* | 5/2006 | Blasko | 715/703 |
| 2006/0242607 A1* | 10/2006 | Hudson | 715/863 |
| 2007/0177803 A1* | 8/2007 | Elias et al. | 382/188 |
| 2007/0236472 A1 | 10/2007 | Bentsen et al. | |
| 2007/0236475 A1 | 10/2007 | Wherry | |
| 2008/0054039 A1* | 3/2008 | Wulff et al. | 224/575 |
| 2008/0168366 A1 | 7/2008 | Kocienda | |
| 2009/0058830 A1 | 3/2009 | Herz et al. | |
| 2009/0077464 A1 | 3/2009 | Goldsmith et al. | |
| 2009/0128505 A1 | 5/2009 | Partridge et al. | |
| 2009/0174667 A1 | 7/2009 | Kocienda et al. | |
| 2009/0179867 A1 | 7/2009 | Shim et al. | |
| 2009/0265669 A1 | 10/2009 | Kida et al. | |
| 2009/0265670 A1 | 10/2009 | Kim et al. | |
| 2010/0156812 A1 | 6/2010 | Stallings et al. | |
| 2010/0182246 A1 | 7/2010 | Petschnigg et al. | |
| 2010/0313125 A1 | 12/2010 | Fleizach et al. | |
| 2010/0328201 A1 | 12/2010 | Marvit et al. | |

OTHER PUBLICATIONS

Letter of EPO Counsel Brookes Batchellor in response to Rule 161-162, dated Feb. 27, 2011.

Claims filed on Feb. 11, 2011 in response to Rule 161 for correpsonding EPO application.

Horry, Y. et al., "A passive-style buttonless mobile terminal", IEEE International Conference on Consumer Electronics, 2003. ICCE. 2003, Jun. 17-19, 2003, IEEE Transactions on Consumer Electronics, vol. 49, No. 3, Aug 2003, pp. 530-535.

"Cellwatch M500 Wrist-Watch Phone" <http://www.gizmag.com/cellwatch-m500-wrist-watch-phone/8743/>.

"DealExtreme: $6.24 Touch Screen TV/DVD Remote Controller Wrist Watch" <http://www.dealextreme.com/details.dx/sku.5954>.

"IBM's Linux Wristwatch" <http://www.freeos.com/articles/3800>.

"iMobile M600 Wrist Watch Cell Phone with Touch Screen" <http://chipchick.com/2007/12/imobile_m600_wrist_watch_cell_phone_with_touch_screen.html>.

"Milestones" <http://www.casio-europe.com/euro/watch/milestones/>.

"New Wrist Watch Phone Debuts in China" <http://www.slipperybrick.com/2007/08/new-wrist-watch-phone-debuts-in-china/>.

"A Passive-Style Buttonless Mobile Terminal" IEEE Transactions on Consumer Electronics, vol. 49, No. 3, Aug. 2003.

Response filed in European Patent Application No. 09 705 231.0-1245.

\* cited by examiner

USER INTERFACE OF A SMALL TOUCH SENSITIVE DISPLAY FOR AN ELECTRONIC DATA AND COMMUNICATION DEVICE

CROSS REFERENCE TO RELATED APPLICATIONS

The present application claims priority to Provisional application titled "User Interface of a Small Touch Sensitive Display For an Electronic Data and Communication Device" filed on Feb. 1, 2008 with Ser. No. 61/025,748, included herein in its entirety by reference.

FIELD OF THE INVENTION

Embodiments of the present invention are directed to multi-touch displays on small, wearable, electronic data and communication devices, and to methods for operating the said electronic data and communication devices by inputting unique contact gestures on the communication devices, including through said multi-touch displays.

BACKGROUND

Electronic data and communication devices keep getting smaller, even as their information processing capacity increases drastically. Many of the latest portable communication devices have touchscreen-based user interfaces, which allow for finger or stylus based operation. Often, these touchscreen user interfaces are supported by some on-board mechanical buttons. While even smaller displays are now possible, there does not exist an effective user interface for devices using such small displays. Further, there do not exist adequate methods to communicate exclusively through contact gestures, such that electronic data and communication devices can altogether do away with any mechanical buttons.

DETAILED DESCRIPTION OF EMBODIMENTS

Definitions

A gesture is an interpretation of some physical input external to the device to cause the device to take some action.

A contact gesture would be a kind of a gesture, where the physical input initiating the contact is a touch on the device, generally the touchscreen.

A contact is the action of contacting the device, generally the touchscreen.

Figure 1:
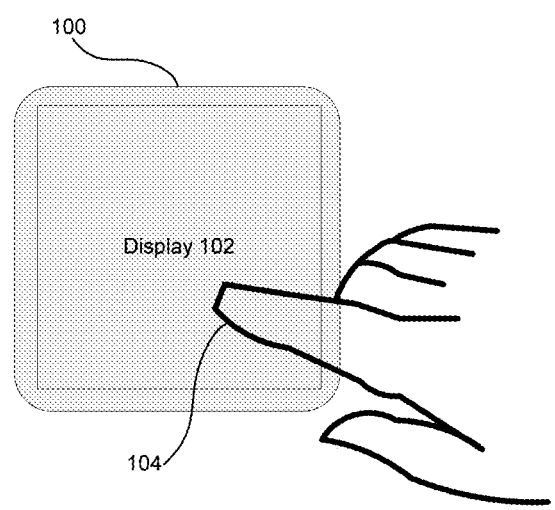
FIG. 1 illustrates an embodiment of an electronic data and communication device display, responsive to user input.

FIG. 1 illustrates an embodiment of an electronic data and communication device display, responsive to multi-touch input. The device 100 is small enough to allow the device 100 to be worn by a user (e.g., in a wristwatch accessory). The display 102 thus has a relatively small display area (e.g., 1 inch×1 inch). However, almost all user interfaces are optimized for pocket-based devices, such as cell phones, that have larger screens typically greater than 3" diagonal. But devices with these size displays are not usually comfortably worn by people. The user interface for a much smaller, wearable touchscreen device 100, with screen sizes less than 2" diagonal (or 1.5" or 2.5", for example), is different, in order to provide an easy to use, intuitive way to operate such a small device. Additionally, device 100, in some embodiments, does not include any buttons, adding complexity to the user interface, but also making water resistance easier to achieve.

An embodiment includes a method comprising receiving an input by a user, on an interactive touch screen display 102 of an electronic data and communication device 100, the input comprising a touchscreen single contact gesture, or a touchscreen multiple simultaneous contact gestures, wherein the touch screen contact gestures are at least one of a first contact gesture type, a second contact gesture type, a third contact gesture type, and a fourth contact gesture type. The first contact gesture type can be a primary contact gesture, the second contact gesture type is a secondary contact gesture, the third gesture type is a tertiary contact gesture, and the fourth gesture type is a universal contact gesture. The method can further include performing an operation or entering an operational mode based on the user input contact gesture. Additional alternate embodiments have a provision for a single contact gesture or a multiple simultaneous contact gesture which may or may not be a touchscreen contact gesture. The embodiments include accelerometers on the device that recognize contact gestures on the device, not necessarily on the touchscreen, which contact gestures are also at least one of the said first contact gesture type, the second contact gesture type, the third contact gesture type, and the fourth contact gesture type.

Figure 2:
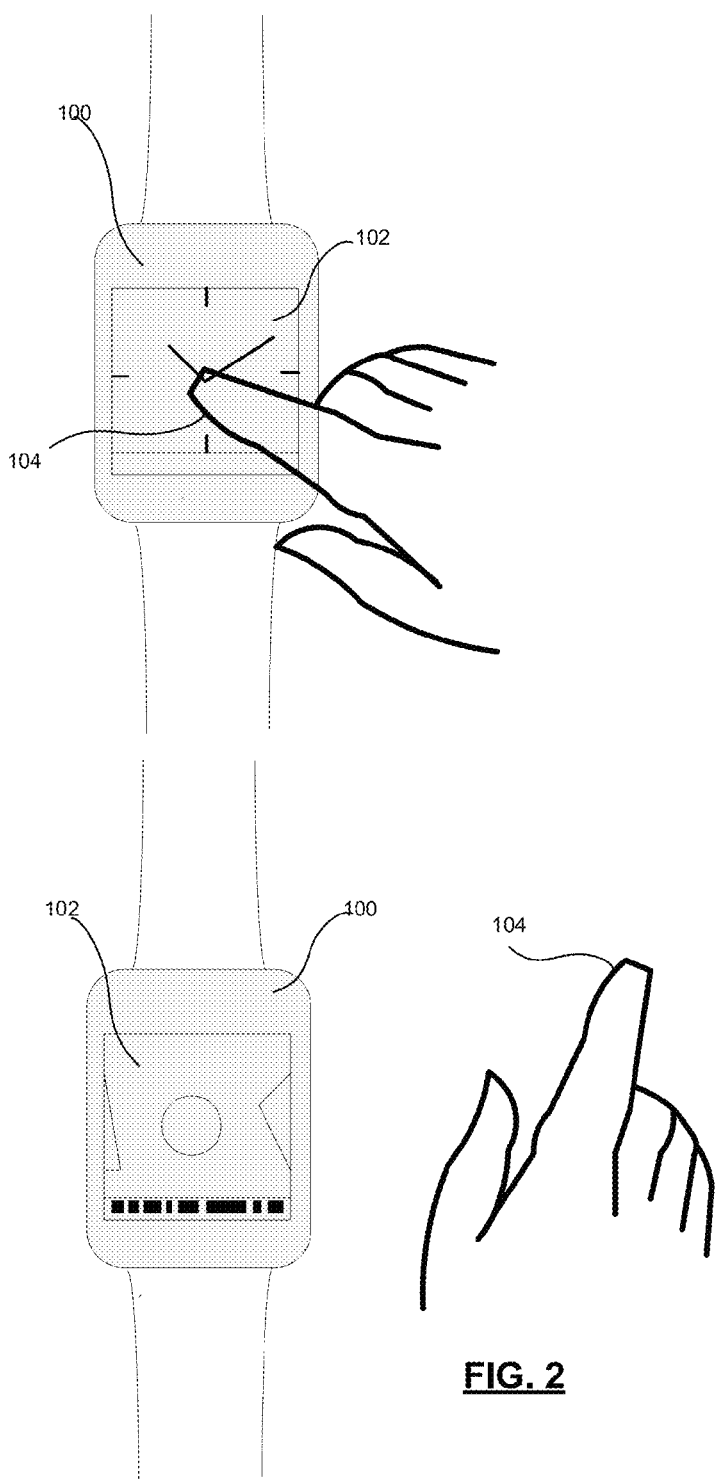
FIG. 2 illustrates an embodiment of a wearable electronic data and communication device with a touch screen display responsive to user input.

FIG. 2 illustrates an embodiment of a wearable electronic data and communication device with a multi-touch display responsive to multi-touch input. Here the device 100 is mounted in a wristwatch accessory. In one embodiment, the electronic data and communication device 100 may be implemented as a module that is removably inserted into a receptacle formed into the case for the portable device, such as a watch, for example. Shown in FIG. 2 is an embodiment wherein a default mode of operation is a clock/watch face shown on display 102. When a user implements a contact gesture using his or her finger tip 104 the default mode of operation can change to an icon mode, shown on display 102.

Contact gestures recited above are defined as Primary, Secondary, Tertiary, and Universal based on the functions they are mapped to, and the frequency with which said functions are invoked. In an embodiment, each primary contact gesture can be mapped to a frequently used function in an operational mode or in a plurality of operational modes, wherein inputting a primary contact gesture causes the electronic data and communication device to invoke the specific function to which the primary contact gesture input by the user is mapped in that operational mode. Each secondary contact gesture can be mapped to an occasionally used function in an operational mode or in a plurality of operational modes, wherein inputting a secondary contact gesture causes the electronic data and communication device to invoke the specific function to which the secondary contact gesture input by the user is mapped in that operational mode. And each tertiary contact gesture can be mapped to a rarely used function in an operational mode or in a plurality of operational modes, wherein inputting a tertiary contact gesture causes the electronic data and communication device to invoke the specific function to which the tertiary contact gesture input by the user is mapped in that operational mode.

In an embodiment each universal contact gesture is mapped to a function in all operational modes, wherein inputting a universal contact gesture causes the electronic data and communication device to invoke the specific function to which the universal contact gesture input by the user is mapped in all operational modes.

Some embodiments incorporate several single contact gestures wherein one human finger is used as an input device. For example, a contact gesture can include, but is not limited to, a single tap contact gesture shown in FIG. 2, a hold contact gesture, a quick tap and hold contact gesture, a double quick tap contact gesture, a double quick tap and hold contact gesture, a triple quick tap contact gesture, an edge to edge swipe contact gesture, a double edge swipe contact gesture, a corner to corner swipe contact gesture and a quadruple edge swipe contact gesture. The double edge swipe further comprises at least one of a single contact travelling from one corner to the opposite corner along the two perpendicular edges via the corner clockwise from the starting corner and travelling from one corner to the opposite corner along the two perpendicular edges via the corner anti-clockwise from the starting corner. The corner to corner swipe further comprises at least one of a single contact starting at the top right corner of the display and moving diagonally down to the bottom left corner of the display and a single contact starting at the top left corner of the display and moving diagonally down to the bottom right corner of the display. And the circumferential edge swipe further comprises at least one of a single contact starting at the top edge of the display and moving around all four edges, traversing the entire circumference of the edge before release and a single contact starting at the bottom edge of the display and moving around all four edges, traversing the entire circumference of the edge before release. Each of these gestures can be mapped to a different function, and may be programmed to be primary, secondary, tertiary, or universal contact gestures, or alternatively all of the aforementioned.

Figure 3:
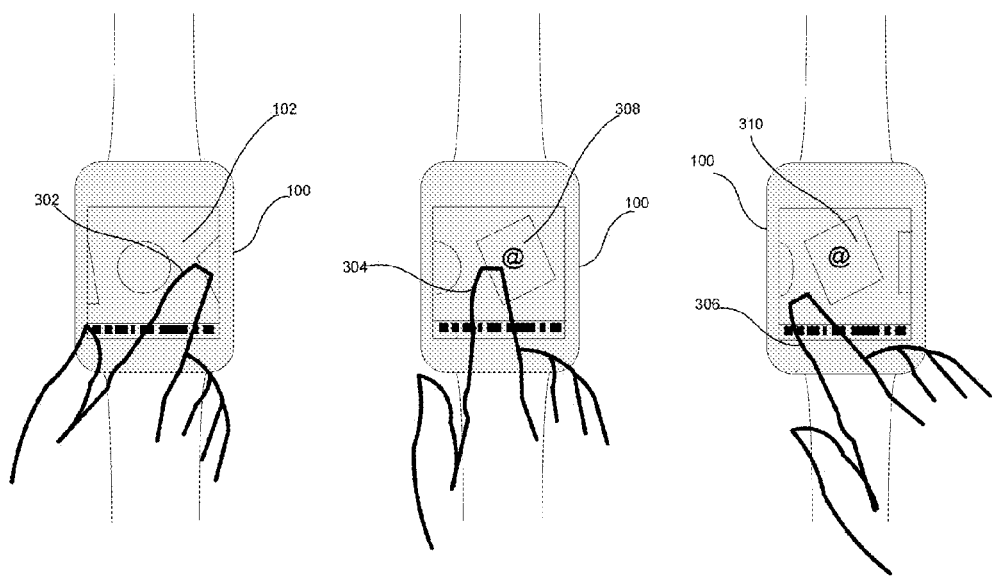
FIG. 3 is a step-by-step illustration of a swipe operation performed on the display of the device shown in FIG. 2.

FIG. 3 shows a step-by-step illustration of a swipe operation performed on the display of the device 100 shown in FIG. 2. Illustrated in the figure is a swipe operation from anywhere on the right side of the display 102 to the left side of the display 102. The icon mode of operation shown in FIG. 3 presents to the user at any given time, one icon of an available application. To switch from a choice of available applications, a user uses the swipe operation in either the left to right direction or the right to left direction. Shown is a first position 302 of a user finger tip, a second position 304, and a third position 306 wherein the application icons move from one end of the display (from the right side in the embodiment illustrated) to another other end. For illustrative purposes, an application icon is shown to move from position 308 to position 310.

Various embodiments also incorporate several multiple simultaneous contact gestures wherein more than one finger is used. For example, these multiple simultaneous contact gestures include, but are not limited to, a two finger hold on screen contact gesture wherein two fingers touch the display screen simultaneously, and remain on the screen for a predefined time to indicate an instruction, a two finger hold and drag contact gesture wherein two fingers touch the display screen simultaneously for a predefined time period, and then move in a particular direction (upwards, downwards, sideways, diagonally, etc.), a two finger single tap contact gesture, a two finger double tap contact gesture, a two finger triple quick tap contact gesture, and a one finger up, one finger down contact gesture wherein one finger placed on the top of the display is swiped down and another finger placed on the bottom of the display is swiped up approximately simultaneously. Each of the multiple simultaneous contact gestures, and especially the one finger up, one finger down contact gesture wherein the finger placed on the top of the display is swiped down and the finger placed on the bottom of the display is swiped up approximately simultaneously, can be mapped to either primary, secondary, tertiary, or universal contact gestures, or alternatively, to any combination or all of the aforementioned.

In an embodiment, the primary contact gestures comprise a single tap contact gesture, a hold contact gesture, a quick tap and hold contact gesture, a double quick tap contact gesture, an edge to edge swipe contact gesture, and a corner to corner swipe contact gesture. The secondary contact gestures comprise a double quick tap and hold contact gesture, a two finger hold on screen contact gesture, a two finger hold and drag contact gesture, a two finger single tap contact gesture, a two finger double tap contact gesture, and a one finger up, one finger down contact gesture wherein the finger placed on the top of the display is swiped down and the finger placed on the bottom of the display is swiped up approximately simultaneously. The tertiary contact gestures comprise a triple quick tap contact gesture, and a two finger triple quick tap contact gesture. And the universal contacts or gestures further comprise a single tap contact gesture, a double tap contact gesture, a swipe left contact gesture, a swipe right contact gesture, a swipe up contact gesture, a swipe down contact gesture, a hold with one finger contact gesture, a hold with two fingers contact gesture, a hold and drag contact gesture, a two finger single tap contact gesture, a two finger double tap contact gesture, a tap and hold contact gesture, a diagonal corner to corner contact gesture and a triple quick tap and hold contact gesture. In an embodiment one of the universal contact gestures enables the user to exit from a default mode of operation and enter into another operational mode; another universal contact gesture further causes an exit from an operational mode back to a default mode of operation.

In an embodiment, all primary contact gestures are universal gestures, but all universal contact gestures are not primary contact gestures. Other variants are possible, wherein all primary contact gestures are not necessarily universal contact gestures. Again, in some embodiments, all secondary contact gestures are also universal gestures, but all universal contact gestures are not secondary gestures. Universal contact gestures are those contact gestures, wherein no matter which application mode the user is in, that contact gesture invokes the same function or operation. For example, a double tap contact gesture may be mapped to a zoom operation, or mapped to an operation to return to the default application mode. In the first mapping, as a universal contact gesture, whether the user is in default mode, icon mode, or application mode, the double tap contact gesture would always invoke a zoom operation. On the other hand, primary, secondary, and tertiary contact gestures may be mapped to varied or different operations or functions in different specific operational modes.

As an example, in an embodiment a single finger hold contact gesture is mapped to an icon mode of operation. Thus, if a user is in a default mode of operation and the user performs a single finger hold contact gesture, the icon display mode of operation results. Once in the icon mode, the user can navigate through the icon mode by swiping left wherein the screen or selection moves leftward, or by swiping right, wherein the screen or selection moves rightward. The icon mode displays an application icon, and a user selects a desired application by performing a single tap contact gesture on the application icon. Essentially, the horizontal swipe operation enables the user to swipe through available applications, so as to view a plurality of available applications, each of which are displayed individually. And selection of a desired application is implemented by performing a single tap contact gesture on the displayed application icon. Alternatively, a vertical swipe operation can be used to enable a user to swipe through available applications. Further, a user may be able to perform either a horizontal or a vertical swipe operation to view a plurality of available applications, as would be apparent to a person having ordinary skill in the art.

As disclosed above, in an embodiment, primary contact gestures are mapped to most frequently used operations/applications, and enable a user in an application mode to select and navigate through a selected application. In one embodiment, the primary contact gestures are a single tap which is mapped to a select operation, a double tap mapped to a zoom operation, a swipe left mapped to a move screen or selection left operation, a swipe right mapped to a move screen or selection right operation, a swipe up mapped to a move screen or selection up operation (e.g., a move up or down a hierarchy of applications, folders, or some other hierarchy of organized data), a swipe down mapped to a move screen or selection down operation, a one finger hold mapped to a go to icon mode operation, and a two finger hold mapped to a return to home application. In an embodiment, all the aforementioned primary contact gestures are also universal contact gestures. So, for example, if a user is in (say) an application mode, and the user performs one finger hold, the electronic data and communication device returns to the icon mode. In fact, since the one finger hold is a universal contact gesture, no matter which mode the user is in, a one finger hold operation takes the user to the icon mode. Similarly, no matter what application the user is running, a two finger hold will always take the user back to home application. The home application, also referred to as a default application, in an embodiment, is a watch or a clock, or any other time display application.

Again, in an embodiment, secondary contact gestures are mapped to occasionally used operations/applications, and enable a user in an application mode to select and navigate through a selected application. In one embodiment, the secondary contact gestures can be a hold and drag contact gesture which is mapped to a move operation, a two finger single tap contact gesture, a two finger double tap contact gesture, a tap and hold contact gesture, a diagonal corner to corner contact gesture (L-R and R-L), all of which can be reserved and assigned to other user interface operations. The diagonal corner to corner:L-R contact gesture, includes a drag operation wherein at least one finger touches the left corner and moves diagonally towards and up to a right corner, and the diagonal corner to corner:R-L contact gesture includes a drag operation wherein at least one finger touches a right corner and moves diagonally towards and up to a left corner. In an embodiment, all the aforementioned secondary gestures are also universal contact gestures. So, for example, if a user is in (say) an application mode, and the user performs a hold and drag contact gesture, the electronic data and communication device invokes the move operation. In fact, since the hold and drag contact gesture is a universal contact gesture, the hold and drag contact gesture performs a move operation even outside the application mode, provided that the mode in which the user is operating, has move functionality. For example, if there is nothing to move, then the move operation will not be functional in that particular mode. Thus, a hold and drag contact gesture is mapped to a move operation no matter which mode the user is operating in. In an alternate embodiment, the hold and drag contact gesture need not be a universal contact gesture; for an operational mode that does not have (say) a move functionality, the hold and drag contact gesture could be mapped to a specific operation in that operational mode. Other variations are possible, as would be apparent to a person having ordinary skill in the art.

Also in an embodiment, tertiary contact gestures are mapped to rarely used operations/applications, and enable a user in an application or any other operational mode to select and navigate through a selected application, and perform an operation or operations. In preferred embodiments, most tertiary contact gestures are application-specific and perform different functions/operations in different application modes of the electronic data and communication device. In one embodiment, the application-specific tertiary contact gestures is a triple quick tap, a double quick tap and hold, a top corner-to-corner contact gesture, a bottom corner-to-corner contact gesture, a left side corner-to-corner contact gesture, a right side corner-to-corner contact gesture, a two finger triple tap, a two finger "walk"-Left down, Right up and swap gesture, a two finger "walk"-Right down, Left up and swap, a circle the border contact gesture, a "Right angle" two side border contact gesture, and a triple quick tap and hold contact gesture. In some embodiments, none of the aforementioned tertiary contact gestures are universal contact gestures, except for the triple quick tap and hold contact gesture, which in an embodiment, is mapped to a global reset function. In these embodiments, no matter which application mode the user is in, a triple quick tap and hold contact gesture will reset the electronic data and communication device. In one embodiment, two diagonal swipes, in the form of an "X", would reset the device. In some embodiments, rather than a triple tap and hold contact gesture, the triple tap contact gesture is used.

In an embodiment, the default display mode of the electronic data and communication device is a watch or clock face/shape that displays the time. In the default display mode, a user input universal contact gesture enables the device to enter into an operational mode based on the type of universal contact gesture entered. For example, in an embodiment, a particular universal contact gesture may cause the device to enter into an icon mode of operation. Another universal contact gesture may cause the device to enter directly into a specific application. Different universal contact gestures can be mapped to different applications, and rather than a two step process of first entering an icon mode and then selecting an application, a user may wish to directly enter into a specific application. Based on the universal contact gesture entered, the application to which the said contact gesture is mapped may be run by the device. In an embodiment, a one finger hold universal contact gesture (also a primary gesture) takes the user from the default mode to the icon display mode of operation. Alternatively, an embodiment may provide an additional icon mode of operation entered into through a universal contact gesture, wherein the additional icon mode carries icons of only user preferred applications thus making for quicker user navigation.

In addition to the disclosed primary, secondary, tertiary, and universal contact gestures, some embodiments carry with them certain "open contact gestures" which are user configurable. For example, if a two finger hold and drag contact gesture is an open contact gesture, the user has the option to map that contact gesture to whichever function he or she chooses.

Embodiments disclosed describe a simple method for a multi-touch user interface, wherein, in some embodiments, all desired actions can be accomplished in less than three consecutive contact gestures. In some embodiments, the disclosed method enables all actions to be accomplished with just a single or two fingers. The method disclosed is applicable to user interfaces of all sizes, and especially of small sizes. Further, the disclosed method makes possible, electronic communication devices without mechanical buttons, and enables the provision of an interface that has a clean, uncluttered look.

An embodiment comprises an interface whose approximate size is an active portion less than or equal to 1.5 inch diagonal. Alternate embodiments comprise an interface whose approximate size is an active portion less than or equal to approximately 2.5 inches diagonally. However, other variants are possible (e.g., approximately 1.8 inches or 2.2 inches). Further, the method is applicable for a round, square, or any other shaped touchscreen. Some embodiments employing the disclosed method are smart, self-configuring, electronic data and communication devices. For example, in one embodiment, the device 100 is used in a watch case, wherein the device 100 can detect the shape of the watch case, i.e. whether the watch case is round, square, oval, etc. The user interface can then automatically reconfigure itself to arrange and format the display according to the shape of the case. Also, the contact gestures input are automatically adjusted to accommodate the display shape. In an embodiment, the touchscreen is a capacitive touchscreen, with a resolution of at least 160 ppi. Again, other types of touchscreens with varied resolutions can also implement the disclosed method as would be apparent to a person having ordinary skill in the art.

As an example, embodiments of the disclosed method can be implemented in the following steps: Beginning with a default mode of operation wherein in an embodiment, the default mode of operation (home) is a watch face, a user inputs a universal contact gesture to enter into an icon mode. The universal contact gesture input (say) is a one finger hold. In the icon mode, the embodiment facilitates swiping left or right (or/and swiping up and down) to view available or user preferred application icons, and a single finger single tap on the displayed application icon enables the user to enter into the application whose icon was tapped. The embodiment employs a two finger hold contact gesture to move back from an application mode to an icon mode. Some embodiments enable all primary and universal contact gestures in all application modes. Secondary contact gestures are generally intuitive, easy to remember, and operations mapped to secondary contact gestures can be more application specific. Tertiary contact gestures are more complex, harder to remember, but may be necessary for some applications, and are mapped to least frequently used operations. Therefore, a user is equipped to navigate through all applications with primary and universal contact gestures, most applications with primary and secondary contact gestures, and some applications with primary, secondary, and tertiary contact gestures, wherein primary contact gestures are the most commonly used and tertiary contact gestures are least commonly used contact gestures, mapped to most commonly invoked operations, and least commonly invoked operations respectively. Additionally, in some embodiments are provided non-universal contact gestures, which contact gestures can be assigned by the user to certain application specific operations.

Figure 4:
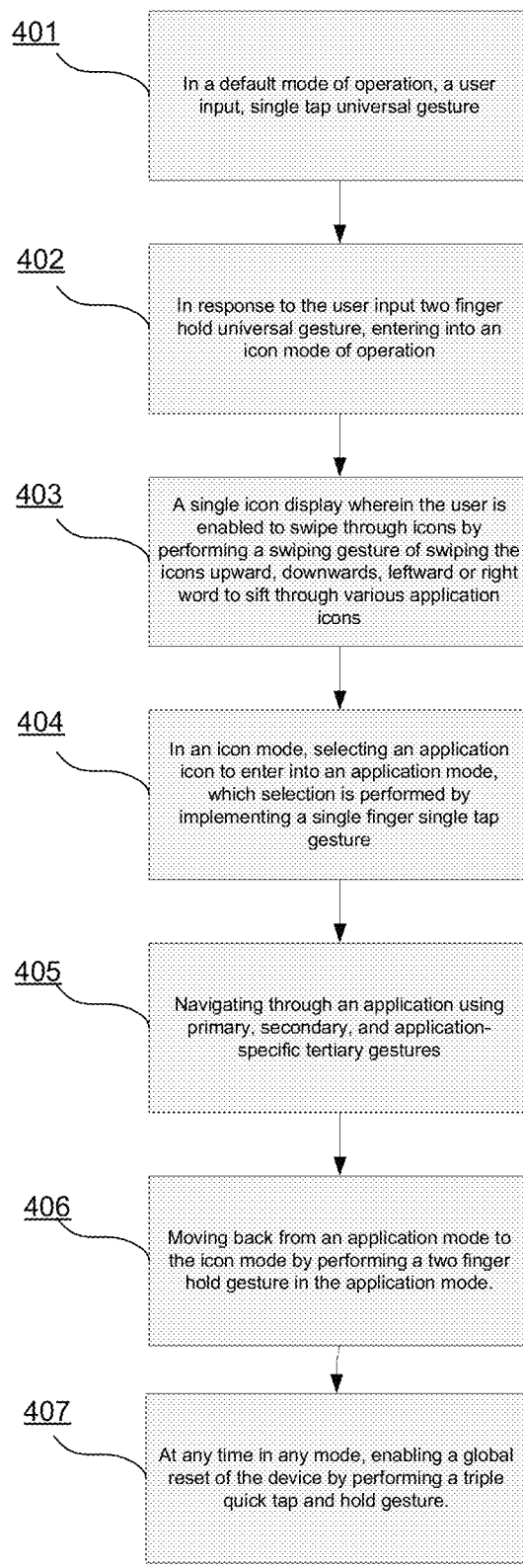
FIG. 4 illustrates a step-by-step process flow of an embodiment in an electronic data and communication device.

FIG. 4 illustrates a step-by-step process flow of an embodiment in an electronic data and communication device. The step-by-step process flow illustrated, is for one embodiment, and depicts a method by which a user may navigate from a default mode to an application mode of operation. In step 401, a user inputs a single tap universal contact gesture to enter into a default mode of operation. In the default mode of operation, the user inputs a two finger hold universal contact gesture, in response to which the device enters into an icon mode of operation as shown in step 402. For the embodiment illustrated in FIG. 4, the icon mode of step 403 is a single icon display wherein the user is enabled to swipe through icons by performing a swiping contact gesture of swiping the icons upward, downwards, leftward or rightward to sift through various application icons. Step 404 comprises, in an icon mode, selecting an application icon to enter into an application mode, which selection is performed by implementing a single finger single tap contact gesture. Step 405 comprises navigating through an application using primary, secondary, and application-specific tertiary contact gestures. Step 406 comprises moving back from an application mode to the icon mode by performing a two finger hold contact gesture in the application mode. And step 407 involves, at any time in any mode, enabling a global reset of the device by performing a triple quick tap and hold contact gesture.

In another embodiment, the device includes accelerometers which detect motion. This sensor could detect if the user tapped either side of the device. The sudden acceleration from a side tap contact gesture would be noticeably different than other ambient motion and could be used as additional device input, in combination with the touch screen contact gestures. This side tap contact gesture also has the benefit of providing a button-less input alternative.

Optional embodiments include a provision wherein all operations can be performed by either primarily swipe, or primarily tap gestures. Preferably, from the home screen (i.e. watch face), in the production software, there can be provided two options to move through the icon carousel: (1) a swipe option for swipers, and (2) a tap option for tappers. The left swipe option will enable a user to swipe to get to the icons when the icons are linearly to the right of the home screen. Or if the icons are arranged as carousel then either a left or right swipe will allow rotation through the entire circular carousel. The tap option on the other hand, will enable a user to tap to get to the icon carousel. For example, a move further down the tree hierarchy is accomplished by a tap for tappers (i.e. the tap option) and a down swipe for swipers (i.e. the swipe option). And a move up the tree hierarchy is accomplished by a double tap and up-swipe respectively, depending on the option selected (i.e. swipe option or tap option). A user could leave home to the icon carousel by either a tap or lateral swipe, and then once at an icon/application, he/she could either tap or down-swipe, or double tap or up-swipe, to move down/up the tree respectively. Various modifications are possible, as would be apparent to a person having ordinary skill in the art.

Figure 5:
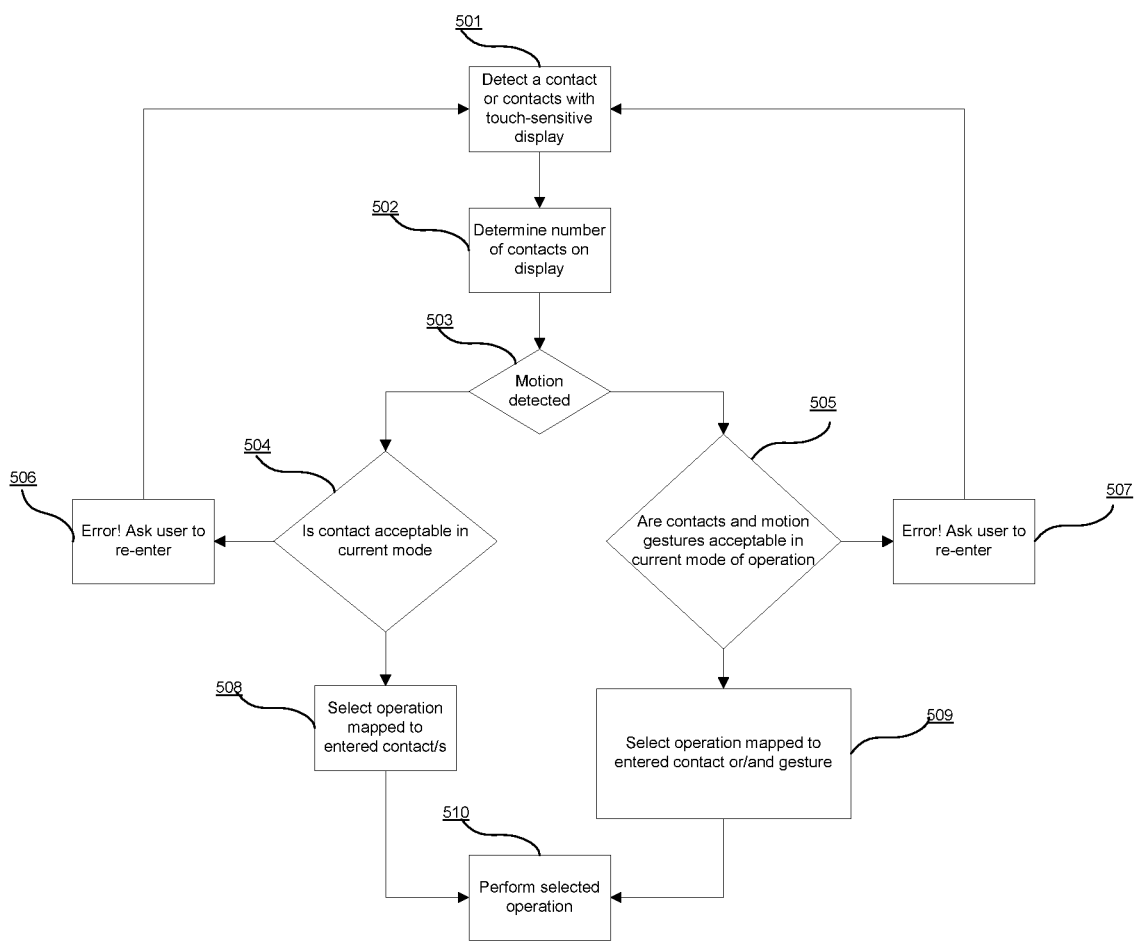
FIG. 5 is a flowchart illustrating further the step-by-step process of FIG. 4.

FIG. 5 is a flowchart illustrating further the step-by-step process of FIG. 4. In step 501, a contact or contacts with the touchscreen display is detected. Step 502 determines the number of contacts detected by the display. Step 503 checks for motion detection. If there is no motion detected, step 504 checks if the contact or contacts detected in the current running mode of the display conform to an acceptable contact gesture in that running mode. In case motion is detected, step 504 checks if the contact or contacts (which contact or contacts equal to a single contact gesture) and motion are acceptable in the current running mode of the display. In step 504 if the contact detected is identified with an acceptable contact gesture in the current running mode of the display, then contact gesture entered is mapped to its' assigned operation and the operation is performed in steps 508 and 510 respectively, and the process repeats itself. Otherwise, an error message is displayed and the user is informed of an invalid entry, as shown in step 506. In step 505 if the contact/s and motion gestures detected are acceptable in the current running mode of the display, then contact/s and motion gestures entered are mapped to their assigned operation and the operation is performed in steps 509 and 510 respectively. Otherwise, an error message is displayed and the user is informed of an invalid entry, as shown in step 507 and the process repeats itself.

The device 100 can include a display, a processor, memory, and various interfaces (both wired and/or wireless), can include a speaker and/or other user output devices and various sensors. The processor can run an operating system (such as Android from Google Inc.) that communicates with, and controls, the other components of the device 100. The device can communicate with a server through the internet. The server can keep track of user information, supply application support and allow a user to more easily manage his or her device, including user preferred gesture selections.

The foregoing described embodiments are provided as illustrations and descriptions. They are not intended to limit the invention to precise form described. In particular, it is contemplated that the functional implementation of invention described herein may be implemented equivalently in hardware, software, firmware, and/or other available functional components or building blocks, and that networks may be wired, wireless, or a combination of wired and wireless. Other variations and embodiments are possible in light of the above teachings, and it is thus intended that the scope of invention not be limited by this Detailed Description, but by the claims following.

The invention claimed is:

1. A method of using a self-configuring communications and display device comprising a processor coupled to a display and memory, comprising:
receiving inputs corresponding to touch screen and non-touchscreen contact gestures on the display device, the display device including an interactive touch screen display area of less than 2" diagonal, and multiple operational modes, a single or plurality of accelerometers for recognizing non-touchscreen contact gestures, and the self-configuring including recognizing and operating according to a wearable accessory on to which the communications and display device is mounted;
responsive to the display device being removably inserted into a receptacle of an accessory, detecting a shape of the accessory and automatically reconfiguring the interactive touchscreen display to arrange and format the said display according to the shape of the accessory;
automatically adjusting the input touchscreen contact gestures to accommodate the display shape and function;
determining whether the input corresponds to a contact gesture type, wherein the contact gesture type is at least one of a primary contact gesture, a secondary contact gesture, a tertiary contact gesture that invoke a particular function in one operational mode and invoke a completely different function in another operational mode, wherein each primary contact gesture is mapped to a frequently used function of at least one operational mode in a plurality of operational modes; each secondary contact gesture is mapped to an occasionally used function of at least one operational mode in the plurality of operational modes; and each tertiary contact gesture is meant to a rarely used function of at least one operational mode in the plurality of operational modes;
determining whether the contact gesture type is a universal gesture that invokes the same function on the device, no matter which operational mode the device is in; and
performing the function corresponding to the contact gesture type in the particular operational mode.

2. The method of claim 1 wherein:
the input contact gestures include a touchscreen single contact gesture, further comprising at least one of a double edge swipe, a diagonal corner to corner swipe, a quadruple edge swipe and a circumferential edge swipe.

3. The method of claim 2 wherein:
the double edge swipe further comprises at least one of a single contact travelling from one corner to the opposite corner along the two perpendicular edges via the corner clockwise from the starting corner and travelling from one corner to the opposite corner along the two perpendicular edges via the corner anti-clockwise from the starting corner;
the diagonal corner to corner swipe further comprises at least one of a single contact starting at the top right corner of the display and moving diagonally down to the bottom left corner of the display and a single contact starting at the top left corner of the display and moving diagonally down to the bottom right corner of the display; and
the circumferential edge swipe further comprises at least one of a single contact starting at the top edge of the display and moving around all four edges, traversing the entire circumference of the edge before release and a single contact starting at the bottom edge of the display and moving around all four edges, traversing the entire circumference of the edge before release.

4. The method of claim 1 wherein the primary contact gestures comprise at least two of: a single tap contact gesture, a double tap contact gesture, a swipe left contact gesture, a swipe right contact gesture, a swipe up contact gesture, a swipe down contact gesture, a hold with one finger contact gesture, and a hold with two fingers contact gesture.

5. The method of claim 4 wherein the single tap contact gesture is mapped to at least one of a select operation and a move screen down operation, the double tap contact gesture is mapped to at least one of a zoom operation and a move screen up operation, the swipe left contact gesture is mapped to a move screen selection left operation, the swipe right contact gesture is mapped to a move screen selection right operation, the swipe up contact gesture is mapped to a move screen selection up operation, the swipe down contact gesture is mapped to a move screen selection down operation, the hold with one finger contact gesture is mapped to at least one of a go to icon mode operation and a go to settings operation, and the hold with two fingers contact gesture is mapped to a return to home application operation.

6. The method of claim 1 wherein the secondary gestures comprise at least two of: a hold and drag contact gesture, a two finger single tap contact gesture, a two finger double tap contact gesture, a tap and hold contact gesture, and a diagonal corner to corner contact gesture.

7. The method of claim 6 wherein the hold and drag contact gesture is mapped to a move operation, and wherein the two finger single tap contact gesture, two finger double tap contact gesture, the tap and hold contact gesture, and the diagonal corner-to-corner contact gestures are reserved and assigned to a user interface operation.

8. The method of claim 6 wherein the said tap and hold gesture is at least one of a single finger tap and hold contact and a multiple fingers tap and hold contact.

9. The method of claim 1 wherein the tertiary contact gestures comprise at least two of: a triple quick tap contact gesture, a double quick tap and hold contact gesture, a top corner-to-corner contact gesture, a bottom corner-to-corner contact gesture, a left side corner-to-corner contact gesture, a right side corner-to-corner contact gesture, a two finger triple tap contact gesture, a two finger "walk"-Left down, Right up and swap contact gesture, a two finger "walk"-Right down, Left up and swap contact gesture, a circle the border contact gesture, a "Right angle" two side border contact gesture, and a triple quick tap and hold contact gesture.

10. The method of claim 9 wherein the triple quick tap contact gesture, double quick tap and hold contact gesture, top corner-to-corner contact gesture, bottom corner-to-corner contact gesture, left side corner-to-corner contact gesture, right side corner-to-corner contact gesture, two finger triple tap contact gesture, two finger "walk"-Left down, Right up and swap contact gesture, two finger "walk"-Right down, Left up and swap contact gesture, and the circle the border contact gesture are mapped to application-specific operations and the triple quick tap and hold contact gesture is mapped to a global reset operation.

11. The method of claim 1 wherein the universal contact gestures further comprise at least two of: a single tap contact gesture, a double tap contact gesture, a triple tap contact gesture, a swipe left contact gesture, a swipe right contact gesture, a swipe up contact gesture, a swipe down contact gesture, a hold with one finger contact gesture, a hold with two fingers contact gesture, a two fingers hold and drag contact gesture, a two finger single tap contact gesture, a two finger double tap contact gesture, a tap and hold contact gesture, a diagonal corner to corner contact gesture and a triple quick tap and hold contact gesture.

12. The method of claim 11 wherein the triple quick tap contact gesture is mapped to a return to home application operation.

13. The method of claim 11 wherein the contact gestures are user configurable, and assignable to user preferred operations.

14. The method of claim 1 wherein the universal contact gestures enable the user to exit from a default mode of operation and enter into another operational mode, and further to exit from an operational mode back to a default mode of operation.

15. In a self-configuring electronic data and communication device comprising a touch screen display, a method comprising:
  responsive to the device being removably inserted into a receptacle of an accessory, self-configuring by detecting a shape of the accessory on to which the electronic data and communication device is mounted and automatically reconfiguring the interactive touchscreen display to arrange and format the said display according to the shape of the accessory;
  detecting an input corresponding to a contact gesture, the device including a touchscreen display having a diagonal of less than 2.2 inches, and wherein the contact gesture corresponds to a signal received from the touchscreen, the device being in a default display mode;
  automatically adjusting the input touchscreen contact gestures to accommodate the display shape and function;
  determining the input contact gesture type wherein the said input contact gesture type is at least one of a primary contact gesture, a secondary contact gesture, a tertiary contact gesture, that invoke a particular function in one operational mode and invoke a completely different function in another operational mode, wherein each primary contact gesture is mapped to a frequently used function of at least one operational mode in a plurality of operational modes; each secondary contact gesture is mapped to an occasionally used function of at least one operational mode in the plurality of operational modes; each tertiary contact gesture is meant to a rarely used function of at least one operational mode in the plurality of operational modes;
  determining whether the contact gesture type is a universal gesture that invokes the same function on the device, no matter which operational mode the device is in; and
  performing the function associated with the input contact gesture type in the particular operational mode.

16. The method of claim 15 further comprising in the determined operational mode, performing an operation in response to another input contact gesture.

17. The method of claim 15 further comprising entering into at least one of an operational mode which is an icon mode displaying individually a plurality of all application icons, and a preferred operational mode displaying individually, icons of a plurality of user preferred applications.

18. The method of claim 15 further comprising, in a home operational mode: entering a tap contact gesture to get to an icon mode of operation; and
  in the said icon mode of operation entering a swipe contact gesture to move from one icon screen to another icon screen.

19. A self configuring, interactive touchscreen display based, electronic data and communication device comprising:
  a memory having instructions encoded thereon;
  at least one of a single and plurality of accelerometers for detecting motion and for detecting non-touchscreen contact gestures wherein the non-touchscreen contact gestures correspond to a predefined instruction to the electronic data and communication device for entering into a specific operational mode; and
  a processor coupled to the memory configured to:
    responsive to the device being removably inserted into a receptacle of an accessory, detect a shape of the accessory and automatically reconfigure the interactive touchscreen display to arrange and format the said display according to the shape of the accessory; and
    automatically adjust user input touchscreen contact gestures to accommodate the display shape and function;
    wherein the interactive touchscreen display causes the electronic data and communication device to perform an operation in response to a user input touchscreen contact gesture, wherein the said user input contact gesture comprises at least one of single and multiple simultaneous contacts recognizable by the device touchscreen, and each contact gesture corresponds to a predefined instruction to the electronic data and communication device for entering into a specific operational mode.

20. The device of claim 19 wherein the encoded instructions further cause the device to map operations to contact gestures, in response to signals received from a web portal.

21. The device of claim 19 wherein the encoded instructions further cause the device to map operations to contact gestures, in response to signals received from a personal computer.

22. The device of claim 19 wherein the encoded instructions further cause the device to map operations to contact gestures, in response to signals received from a mobile phone.

23. The device of claim 19 wherein the device is adapted to be insertable into a wristwatch accessory and self-configure according to the accessory in which it is inserted.

24. In a self-configuring communications and display device comprising a processor coupled to a display and memory, wherein the display comprises an interactive touchscreen display area of less than 2.5" diagonal, a method comprising:

responsive to the device being removably inserted into a receptacle of an accessory, self-configuring by detecting a shape of the accessory on to which the communications and display device is mounted and automatically reconfiguring the interactive touchscreen display to arrange and format the said display according to the shape of the accessory;

receiving an input corresponding to a contact gesture wherein the said input contact gesture indicates at least one of a single contact and a multiple simultaneous contacts;

automatically adjusting the input touchscreen contact gestures to accommodate the display shape and function;

determining whether the input contact gesture corresponds to a contact gesture type, the contact gesture type being at least one of a first primary contact gesture type, a second secondary contact gesture type, a third tertiary contact gesture type, that invoke a particular function in one operational mode and invoke a completely different function in another operational mode, wherein the first contact gesture type is a primary contact gesture wherein each primary contact gesture is mapped to a frequently used function of the at least one operational mode in a plurality of operational modes; wherein the second contact gesture type is a secondary contact gesture wherein each secondary contact gesture is mapped to an occasionally used function of the at least one operational mode in a plurality of operational modes; wherein the third contact gesture type is a tertiary contact gesture wherein each tertiary contact gesture is mapped to a rarely used function of the at least one operational mode in a plurality of operational modes;

determining whether the input corresponds to a fourth contact gesture type, wherein the contact gesture type is a universal gesture that invokes the same function on the device, no matter which operational mode the device is in; and performing a function in an operational mode corresponding to the contact gesture type.

25. The method of claim 24 wherein the input corresponding to the contact gesture is a touchscreen contact gesture, recognizable by the touchscreen display of the device and corresponds to an operation in an operational mode.

26. The method of claim 24 wherein the input corresponding to the contact gesture is a contact gesture recognizable by accelerometers located on the device and correspond to at least one of additional operations and operational modes.

* * * * *